Aug. 13, 1940.　　　H. W. ZIMMERMAN　　　2,211,401
TORQUE MEASURING WRENCH
Filed June 12, 1937　　　3 Sheets-Sheet 3
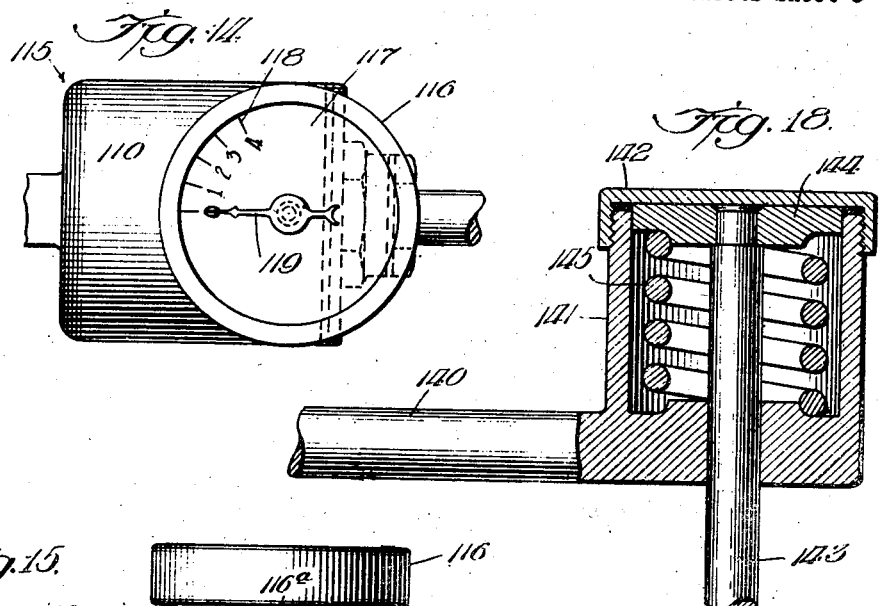
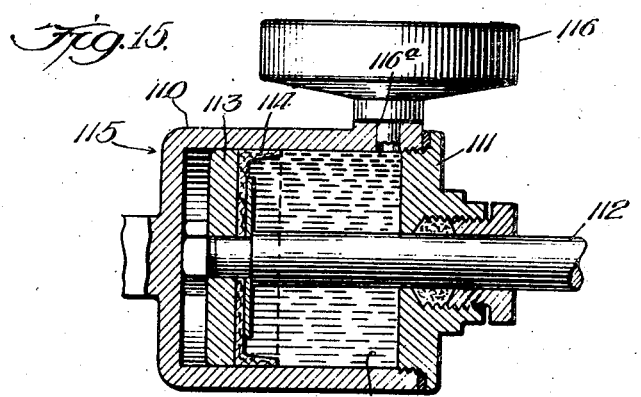
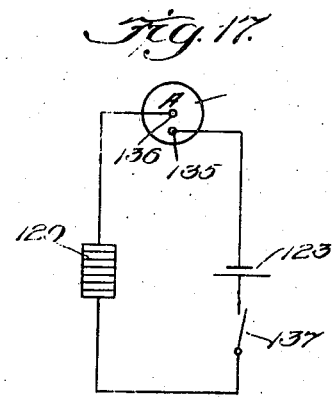
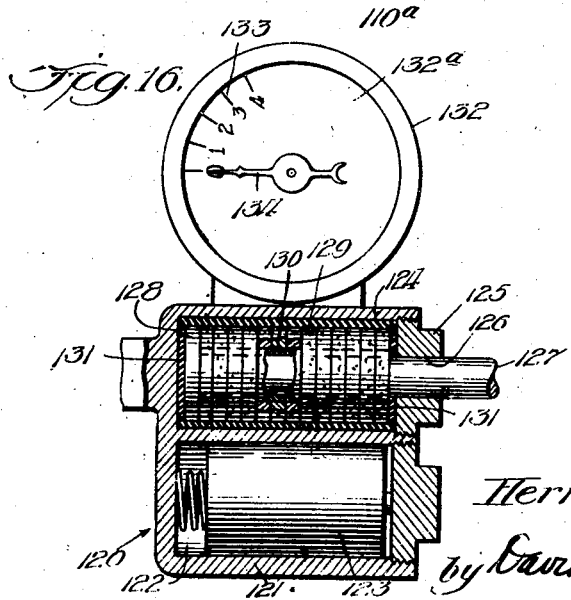
Inventor:
Herman W. Zimmerman
by Davis, Lindsey, Smith & Shonts
Attys.

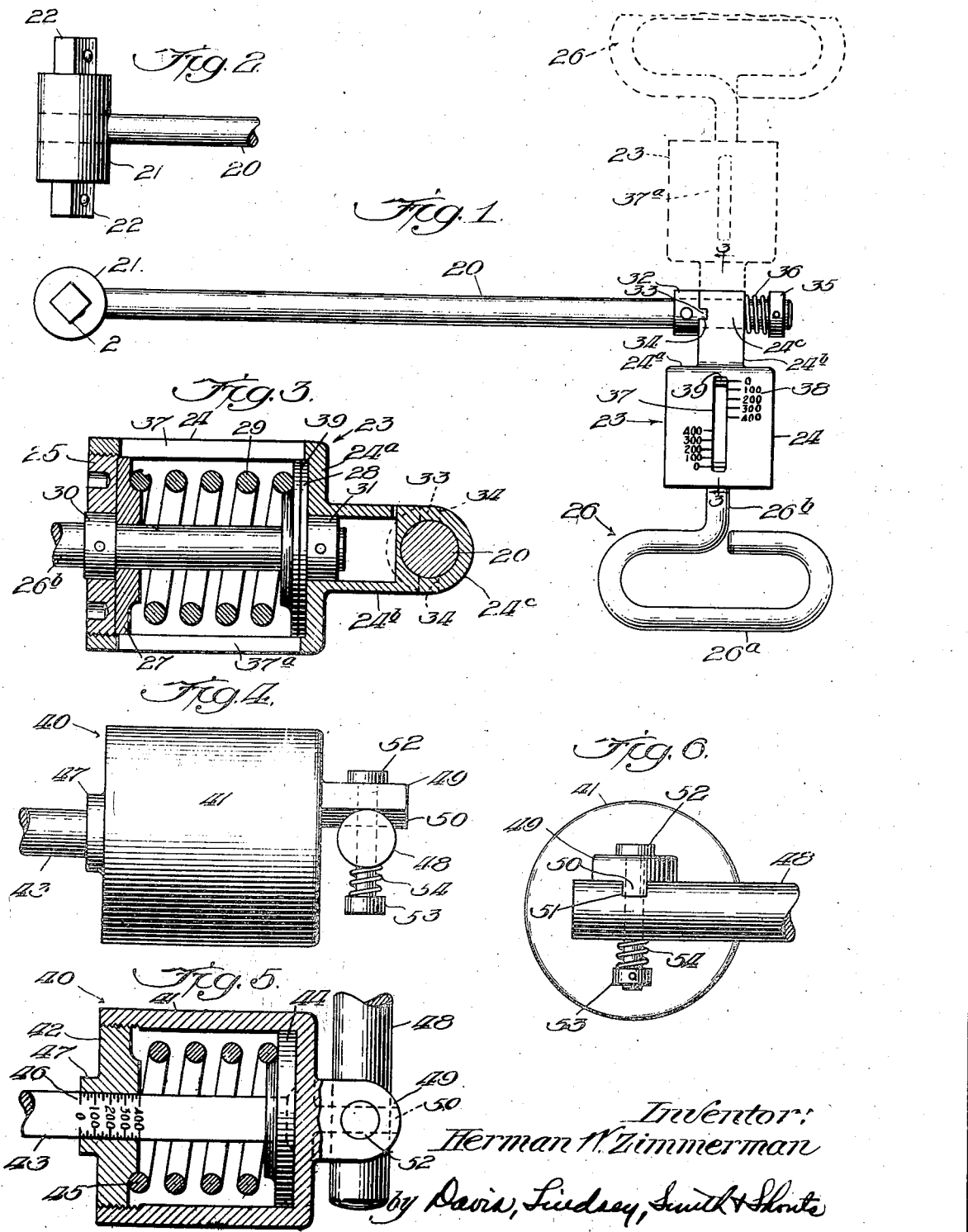

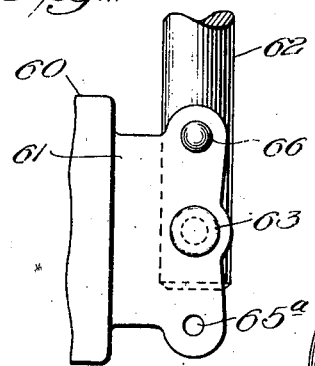
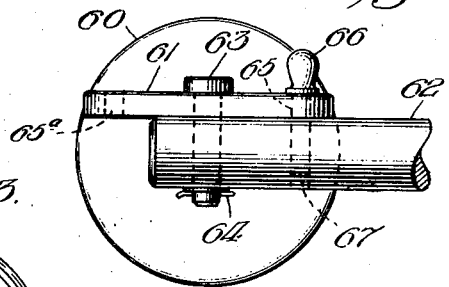
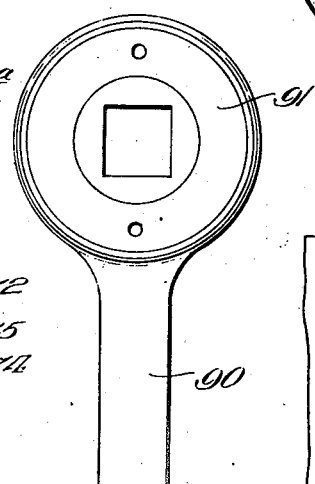
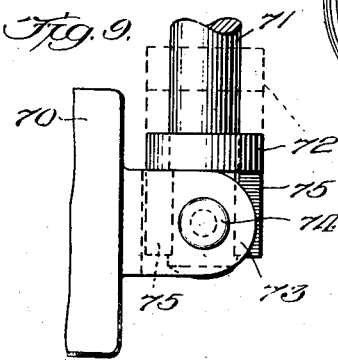
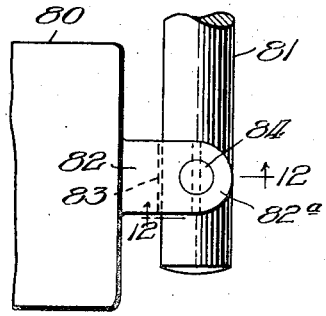
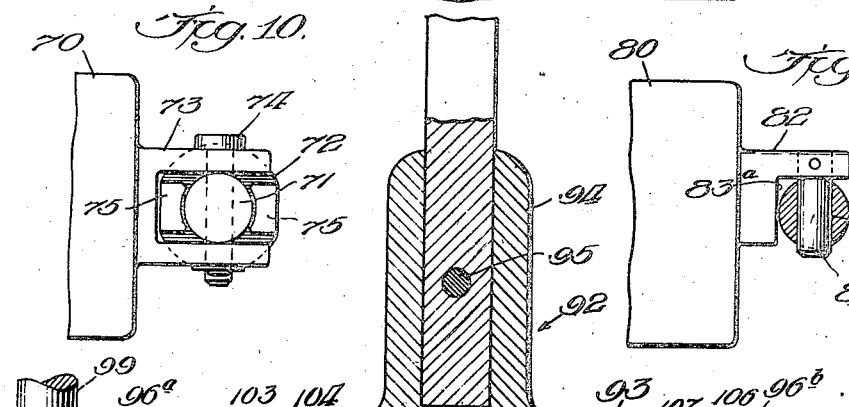
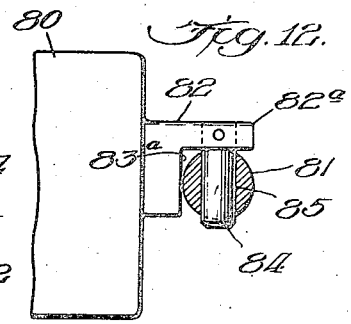
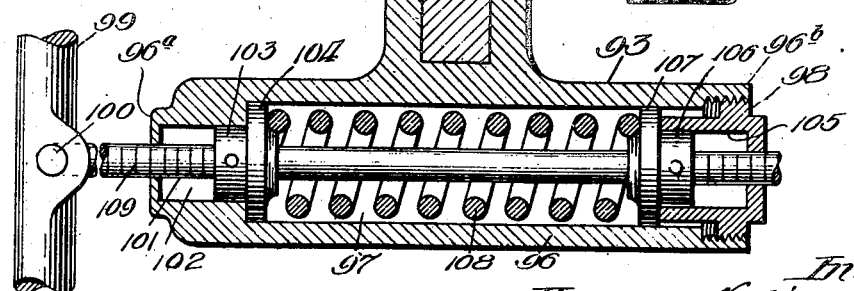

Patented Aug. 13, 1940

2,211,401

UNITED STATES PATENT OFFICE 2,211,401

TORQUE MEASURING WRENCH

Herman W. Zimmerman, Highland Park, Ill., assignor, by mesne assignments, to Automotive Maintenance Machinery Co., North Chicago, Ill., a corporation of Illinois Application June 12, 1937, Serial No. 147,898

9 Claims. (Cl. 265—1)

My invention relates to wrenches, and it has to do more particularly with a wrench for measuring the force or torque applied therethrough in tightening or loosening nuts, bolts, studs, and the like, which will be referred to generally hereinafter as "the work."

One of the objects of my invention is to provide an improved torque measuring wrench which is of simple and inexpensive construction and is adapted to serve its intended purpose efficiently at all times.

Another object is to provide a wrench of the foregoing character having a torque measuring means in the form of a self-contained unit adapted to be applied to the wrench handle and which is adjustable to opposite sides of the handle so that a push or pull force may be exerted upon the wrench handle for either tightening or loosening the work.

A further object is to provide a wrench of the foregoing character including a torque measuring unit embodying pressure indicating means and which is so located with respect to the operator that, irrespective of the length of the wrench handle and the position of the operator relative to the work, the indicating means of the unit is always positioned in close proximity to and within the immediate vision of the operator.

An additional object is to provide an arrangement of the foregoing character wherein the longitudinal median line or axis of the torque measuring unit is always maintained at a predetermined angle (preferably, right angles) to the longitudinal median line or axis of the wrench shank or handle and the axis of the work, so that pressure is always uniformly applied to the work along the most effective lines of force and substantial accuracy in measurement of the force or torque applied through the wrench is insured under all conditions of use.

Other objects and advantages will become apparent as this description progresses, and by reference to the drawings wherein—

Figure 1 is a top plan view of one form of wrench embodying my invention, the torque measuring unit thereof being shown in full lines in one operative position at one side of the shank or handle and in dotted lines in another operative position at the other side of the handle;

Fig. 2 is a side elevational view of the forward or work engaging end of the wrench of Fig. 1;

Fig. 3 is an enlarged section taken substantially on line 3—3 of Fig. 1;

Fig. 4 is an end elevational view of another form of wrench embodying my invention;

Fig. 5 is a horizontal, sectional view taken through the torque measuring unit of Fig. 4;

Fig. 6 is a side elevational view of the structure shown in Fig. 4, and further illustrating the connection between the wrench handle and the torque measuring unit;

Fig. 7 is a top plan view of a modified arrangement for connecting the torque measuring unit to the wrench handle;

Fig. 8 is an elevational view taken at substantially right angles to the view of Fig. 7 and looking toward the attached end of the torque measuring unit;

Fig. 9 is a top plan view of still another form of connection between the torque measuring unit and the wrench handle;

Fig. 10 is an elevational view of the structure shown in Fig. 9, the same being taken endwise of the wrench handle;

Fig. 11 is a top plan view of a further form of torque measuring unit connection;

Fig. 12 is a section taken substantially on line 12—12 of Fig. 11;

Fig. 13 is a top plan view, partially in section, of another type wrench embodying my invention;

Figs. 14 and 15 are top plan and sectional views, respectively, of a hydraulic type of unit for a wrench embodying my invention;

Fig. 16 is a sectional view of an electric form of unit for a wrench embodying my invention;

Fig. 17 is a wiring diagram illustrating an electrical circuit that may be employed in connection with the wrench structure shown in Fig. 16; and Fig. 18 is a fragmental, horizontal, sectional view of still another form of wrench embodying my invention.

Referring to the structure illustrated in Figs. 1 to 3, inclusive, it takes the form of a shank or handle 20 having a cylindrical head 21 at its forward or work engaging end. The head 21 is provided at its opposite ends with rectangular (or other irregularly shaped) shanks 22 adapted to detachably receive any suitable adapter device such as a socket or the like (not shown) for engaging various kinds of work, such as nuts, bolts, studs, etc. The rear end of the handle adjustably supports a self-contained torque measuring unit 23 through which the operator directly applies the force necessary to tighten or loosen the work. The adjustable feature of the unit 23, which will be described in greater detail hereinafter, enables the operator to move the unit to the opposite sides of the handle 20 so that he may apply either a push or pull force in tightening or loosening the work, depending upon the character of the work and upon the position that the operator may assume in applying the desired force thereto.

The torque measuring unit 23 is of the double-acting type, and it includes a cylindrical cup-shaped casing 24 having its open end normally closed by a removable, threaded disk 25. The closed end 24ᵃ of the cylinder 24 is provided with a hollow, axial extension 24$^b$ terminating in a collar-like portion 24$^c$, the axis of which extends at right angles to the axis of the casing 24. This collar-like portion 24$^c$ is adapted to snugly, but rotatably and slidably, receive the outer end of the handle 20 (Figs. 1 and 3). The casing 24 supports a handle 26 having a grip portion 26$^a$ and a stem portion 26$^b$ projecting slidably through the plate 25 and through the casing 24 into the hollow extension 24$^b$. Follower plates 27 and 28 are slidably mounted upon the stem 26$^b$ within the casing 24, and a coil spring 29 is confined between these followers. The stem 26$^b$, outwardly beyond the follower 27 and inwardly beyond the follower 28, is provided with fixed collars 30 and 31, respectively, the collar 30 being slidably guided in a suitable opening through the plate 25 while the collar 31 is slidably guided in the hollow extension 24$^b$. With this arrangement, when outward pull force is applied to the handle 26, such force is transmitted through the collar 31 and follower 28 to the spring 29, which yieldably opposes such movement, and when the spring 29 yields, the stem 26$^b$ slides through the follower 27 so that the collar 30 moves outwardly away from such follower. The reverse action takes place when a push force is applied to the handle 26, such force being applied through the same to the collar 30 and follower 27 to the spring 29, which yieldably opposes such action and, as movement of the handle 26 takes place, the stem 26$^b$ slides through the follower 28, and the collar 31 moves away from the follower 28 into the extension 24$^b$.

The unit 23 is mounted upon the handle 20 in such a way that it is not only rotatable thereon but it is latched in the desired operating position. More particularly, the handle 20, just inwardly of the collar portion 24$^c$, is provided with a fixed collar 32 having a peripheral lug 33 extending toward the outer end of the handle 20 in parallel relation with the axis of such handle. The collar-like portion 24$^c$ is provided, at diametrically opposed points along its end adjacent the collar 32, with notches 34 of proper dimensions to snugly receive the latch lug 33. I have found that, in order that the force exerted by the operator may be applied along the most effective lines of force, the axis of the unit 23 should be disposed at substantially right angles to the axes of the handle 20 and the work. Also, in order that the force be applied uniformly at all times, thereby insuring accuracy in the measuring function of the unit 23, it is desirable to provide an arrangement by which the intended right-angular relationship above mentioned is maintained in all operative positions of the unit 23. These features are accomplished through the lug-and-notch structure 32, 33, just described, in that the lug 33 is parallel with the axis of the handle 20 and it is disposed in a plane intersecting the axis of the work at right angles thereto, while the notches 34 are disposed at right angles to the axis of the torque measuring unit 23 and in directly opposed parallel planes so located that when the lug 33 is engaged in either of the notches, the axis of the unit 23 is disposed at right angles to the axis of the handle 20 in a plane extending at right angles to the axis of the work.

The foregoing relationship between the unit 23, handle 20 and the work is releasably maintained in both the full-line and dotted-line positions shown in Fig. 1. The unit is held yieldable in either of these positions by a collar 35 fixedly secured to the outer end of the handle 20 and by a spring 36 confined between such collar and the adjacent edge of the unit collar portion 24$^c$. When it is desired to move the unit 23 from the full-line position shown in Fig. 1 to the other side of the handle (dotted-line position of Fig. 1), it is only necessary to slide the unit 23 outwardly along the handle 20 compressing the spring 36 to an extent sufficient to release the lug 33 from the then-engaged notch 34 and to then rotate the unit 180 degrees and release the same, at which position the spring 36 urges the unit forwardly to engage the lug 33 with the other notch 34.

In the use of this form of wrench for tightening the work, with the parts shown in the full-line position of Fig. 1, for example, the operator grasps the handle grip 26$^a$ and exerts a pull force thereon. The spring 29 is provided with an initial tension which is sufficient to oppose relative movement between the handle 26 and casing 24 until the work offers a certain predetermined resistance. When the force applied is sufficient to overcome the initial tension of the spring 29, the handle 26 moves outwardly relative to the casing 24 and by measuring the extent of this movement, I determine the amount of force or torque applied to the work. To this end, the casing 24, at its top and bottom sides, is provided with aligned, diametrically opposed slots 37, 37$^a$, extending nearly throughout the length of such casing. At opposite ends of each of the slots (on both sides of the casing), there are provided opposed and graduated scales 38 that are calibrated, preferably, in terms of inch-pounds pressure. The followers 27 and 28 are each provided around their periphery with an indicator line 39 which, in the normal, at-rest position of the structure, registers, respectively, with the zero markings of the casing scales 38. In the use of the tool as above described, and when the work offers sufficient resistance to overcome the initial tension of the spring 29, the follower plate 28 will move relative to its scale 38 and the extent of movement, as indicated by the line 39 along the respective scale 38, will be registered in terms of inch-pounds pressure applied to the work. With the parts in the same position, and when push pressure is applied to the unit 23, the action will be as above described except that the indicator line 39 on the follower 27 will move relative to its scale 38 and indicate the extent of movement in terms of inch-pounds pressure applied to the work. This latter push action may be employed in loosening the work, it being desirable at times to determine the amount of force required to loosen the work as well as to tighten it. This feature is quite useful in setting up certain kinds of work wherein it is desirable to first set up the work to a certain point, then loosen the same, and then again set it up to the same pressure point. For example, in tightening certain kinds of work, the initial tightening thereof may result in some distortion of the work threads which, if it occurs, may result in an inaccurate pressure indication. In tightening such kind of work, it may be desirable to initially set it up to a predetermined pressure point, then loosen it, and then again set it up to the desired pressure point, whereby any thread distortion is accommodated for and a true pressure indication is received. The foregoing push and pull feature is quite useful in this respect, enabling the operator to do this without removing the wrench from the work.

When the unit 23 is rotated to the dotted-line position of Fig. 1, the same operation as above described takes place, except that, normally, the pull action will be exerted in a work-loosening direction while the push action will be exerted in a work-tightening direction. In this position of the parts, the slot 37ᵃ and its scale markings are exposed to the view of the operator. The foregoing arrangement is quite useful in connection with long-handled wrenches, although it is not necessarily limited thereto. Regardless of the length of the wrench handle, the torque measuring means is directly before the operator and he may readily and quickly observe when the work has been set up to the desired extent. The proper positioning of the measuring unit 23 with respect to the handle is not left to the judgment of the operator and, regardless of the position that he may assume in operating the wrench, the forces will always be applied through the same uniform and most effective paths.

Wrenches embodying my invention may take various forms, some of which will now be briefly described. The form shown in Figs. 4 to 6 includes a torque measuring unit 40 having cylindrical, cup-shaped casing 41 closed at its open end by a threaded disk 42. This unit is of the single-acting type, and it is provided with a handle similar to handle 26 having a stem 43 which extends into the casing 41, where its inner end supports a follower 44. A coil spring 45 is confined between the plate 42 and follower 44 and it serves the same purpose as the spring 29 of the previously-described form. The handle stem 43 is provided with a scale 46 similar to the scale 38 (Fig. 1), and the zero marking of the scale is adapted to register with the outer surface of an indicator lug portion 47 on the disk 42. In the use of this structure, when the work offers sufficient resistance to overcome the initial tension of the spring 45, the stem of the handle 43 will move outwardly relatively to the disk indicator lug 47 and the extent of this movement will be indicated by the extent of movement of the scale 46 relative to the indicator 47. This single-acting structure is adapted to register only a pull force, and when force is applied in the opposite direction it operates substantially as a rigid unit.

In the Fig. 4 form, I employ another arrangement for maintaining the previously described right-angular relationship between the unit 40 and the handle 48. Specifically, the closed end of the casing 41 is provided with an axial extension 49, the under side of which is provided with a central, longitudinally-extending and rectangularly shaped lug 50 which is adapted to seat in a notch 51 formed in the upper side of the handle near its outer end. As will be seen from Fig. 6, the notch 51 is disposed crosswise of the handle at right angles to its axis and also at right angles to the axis of the work. The lug 50 is parallel with the axis of the torque measuring unit 40 so that said unit, by engaging the lug 50 in the notch 51, is maintained in the desired right-angular relationship. The lug 50 is yieldably held in engagement with the notch 51 by a pivot pin 52 passing centrally downwardly and centrally through the extension 49 and the handle 48 to a position somewhat below the latter. A collar 53 is fixedly secured to the lower end of this lug, and a spring 54 is confined between the handle 48 and the collar 53. With this arrangement, the unit 40 may be rotated to the opposite side of the handle where it is held in the desired right-angular position by merely raising the same upwardly to compress the spring 54 sufficiently to disengage the lug 50 from the notch 51 and by rotating the unit 180 degrees around the end of the handle. Otherwise, the construction and operation of this form is the same as that already described.

In Figs. 7 and 8, I show another arrangement for maintaining the desired right-angular relationship between the torque measuring unit, the shank or handle and the work. In this form, the closed end of the torque measuring unit 60, which may take any of the forms described herein, is provided with a comparatively wide extension 61 which is pivotally connected to the handle 62 by a pin 63 passing centrally and downwardly through and below the extension and the handle. The lower end of the pin receives any suitable means, such as a cotter pin 64, for holding the parts in the position described. The opposite outer edges of the unit extension 61 are provided with openings 65, 65ᵃ which are adapted to receive a removable pin 66 which passes therethrough and into an opening 67 provided in the handle 62. The handle opening 67 and the unit openings 65, 65ᵃ are so located that when they are aligned and the pin 66 passed therethrough, the torque measuring unit 60 is held in the right-angular position previously described in connection with the forms of Figs. 1 to 6, inclusive. Assuming that the handle is in the position shown in Fig. 1, it is only necessary to remove the pin 66 and swing the unit 60 around the handle 180 degrees to align the unit opening 65ᵃ with the handle opening 67 for insertion of the pin 66 in order to adjust the unit 60 to opposite sides of the handle, in both of which positions it is held in the desired right-angular relationship.

In the structure shown in Figs. 9 and 10, the torque measuring unit 70 is held in the desired right-angular relationship with respect to the handle 71 by a handle-carried slip collar 72. Specifically, the closed end of the unit 70 is provided with a central, bifurcate extension 73 extending parallel with the axis thereof and between which the forward end of the handle 71 is passed. The extension 73 is pivotally secured to the handle 71 by a pin 74 which passes through the extension 73 and handle 71 at substantially right angles to the axes of the unit 70 and handle 71 and substantially parallel with the axis of the work. The bifurcation of the extension 73 is of sufficient depth and the above connection is sufficiently near the outer end of the handle 71 that the unit 70 may be swung around such end from one side to the other of the handle. The slide collar 72 which embraces the handle 71 is provided with a pair of lateral, opposed arms 75 curved, on their inner, adjacent faces, to snugly engage the opposite sides of the handle 71, and these arms are of sufficient width to readily enter the bifurcation of the extension 73. The outer faces of the arms 75 are squared and this is also true of the inner surface of the bifurcation in which the arms are received, these parts being so dimensioned that when the slide collar 72 is moved to the position shown in full lines in Fig. 9, the squared surfaces of the then-active arm 75 and the bifurcation are in close proximity, preventing any substantial, angular movement in either direction about the pivot pin 74. However, by sliding the collar 72 back to the dotted-line position of Fig. 9, the arms 75 are removed from the bifurcation and the unit 70 is free to swing around the end of the handle to the opposite side thereof, at which time the squared surface of the other and then-active arm 75 cooperates with the inner surface of the bifurcation to prevent any substantial movement about the pin 74.

In Figs. 11 and 12, I have illustrated a structure similar to those previously described except that the torque measuring unit 80 is adapted for ready detachment from the handle 81. In this form, the closed end of the unit 80 is provided with a central extension 82 having a right-angular notch 83 in which the outer end of the handle 81 is received. The portion 82ª of the extension 82 which is disposed over the handle 81 supports a pin 84 which extends downwardly through an opening 85 in the handle, and when the unit 80 is thus assembled with the handle, the vertical edge portion 83ª of the notch 83 is disposed in close proximity to the adjacent surface of the handle 81. The surface 83ª is of sufficient width to extend longitudinally of the handle 81 beyond the opposite sides of the pin 84 so that it prevents rotation of the unit 80 relative to the handle 81. The handle opening 85 and pin 84 are disposed at right angles to the axes of the handle 81 and unit 80, and parallel to the axis of the work, while the notched surface 83 is disposed in a plane at substantially right angles to the axis of the unit 80. With these surfaces so related, the unit 80 is maintained in the desired right-angular relationship described in connection with the first form. In order to adjust the unit 80 to the side of the handle opposite that shown in Figs. 11 and 12, it is only necessary to lift the unit upwardly to disengage the pin 84 and to again engage the parts in the manner described on the other side of the handle.

My invention is well adapted for wrenches of considerable size where one or more workmen may be required to operate the same. One such structure is shown in Fig. 13. In this form, the wrench shank or handle 90 is provided at its forward end with a ratchet head 91 or any other means suitable for engaging the work. The head 91 may be provided with the usual adapter means for engaging the same with the work. A torque measuring unit 92 is mounted at the rear end of the handle 90. Specifically, this unit may take the form of a T-shaped casing 93 having a hollow T-stem portion 94 in which the rear end of the handle is secured by a pin 95 which may be removable or otherwise. The T-head portion 96 of the casing is elongated to extend a substantial distance on the opposite sides of the handle 90, and this portion is provided with an elongated chamber 97 extending at right angles to the axis of the handle 90. Force is applied to the work for tightening or loosening the same by means of torque measuring means carried by casing head 96. The particular structure shown is of the double-acting type, but it may well be of the single-acting type, as will become obvious from the following description.

The casing head 96 is so constructed that its end 96ª is permanently closed, while its other end 96ᵇ is closed by a removable, threaded guide nut 98. The force is applied to the wrench through a handle 99 (removable or otherwise) pivotally connected at 100 to a stem 101 extending from the handle 99 through the end 96ª of the casing and out through the guide nut 98, where it is adapted to receive a handle, which may be either the handle 99 or a similar one. The chamber 97 has a reduced portion 102 extending into the end 96ª of the casing. The portion of the handle stem 101 disposed in this reduced chamber portion is provided with a fixed collar 103 which is adapted to normally abut against a follower 104 in the main chamber 97. The guide nut 98 is provided with a guideway 105 through which the stem 101 passes, and that portion of the stem is provided with a fixed guide collar 106 against which another follower 107 in the chamber 97 is normally disposed. The fixed stem collars 103 and 106 fit snugly in their respective slideways so as to hold the stem 101 in the desired right-angular position with respect to the axis of the handle 90, which relationship is the same as that described in connection with the other forms of my invention. In this way, the handle stem 101 is supported at widely separated points on opposite sides of the handle 90, thereby reducing friction between the moving parts to increase the accuracy of the tool and reduce wear.

A coil spring 108 is mounted in chamber 97 between the followers 104 and 107, and it serves the same purpose as coil spring 29 of Fig. 3. That is to say, when the handle 99 is grasped and pulled by one or more operators, the spring 108 opposes relative movement between the casing 96 and the handle stem 101 until the work offers sufficient resistance to overcome the initial tension of such spring. When the initial tension of the spring 108 is overcome, the handle stem 101 will move relative to the casing head 96 and by measuring the extent of this movement, as in the previously described forms, one may determine the number of inch-pounds pressure applied to the work. This measurement may be accomplished by a scale or indicator arrangement such as shown in Fig. 1 or as shown in Fig. 5. In the latter case, the stem 101 may be provided with a scale 109 calibrated in terms of inch-pounds pressure, and the operator, by noting the extent of movement of the scale relative to the adjacent end of the casing 96 may readily determine the amount of force applied to the work. With this arrangement, any force exerted through the handle 99 will be transmitted to the work through lines of force at right angles to each other, as in the previously described forms, and this will be true regardless of whether one or more operators actuate the handle and whether they apply the same or different pressures thereto. The pivotal mounting of the handle provides a compensating action aiding in the accomplishment of the foregoing features. The same action takes place when the handle 99 is disposed at opposite ends of the casing 96 and also when the handle is actuated to apply either a push or pull force as in the form of Fig. 3.

In certain cases it may be desirable to employ hydraulic means through which the force or torque applied is to be determined. One such arrangement is shown in Figs. 14 and 15. This form is similar to that shown in Fig. 5 except that the outer end of the casing 110 is closed in a fluid-tight manner by a cap 111 through which the operating handle 112 projects. The inner end of the handle 112 supports a piston 113 which supports a suitable packing 114. The space 110ª between the packing 114 and cap 111 is filled with a fluid suitable for hydraulic operation, and the amount of force or torque applied to the work through the unit 115 is determined by measuring the amount of displacement of the fluid in the casing 110. As in the previous cases, this displacement is measured, preferably, in terms of inch-pounds pressure applied and, for this purpose, I employ a hydraulic gage 116 which may take any suitable form, such, for example, as the well-known Bourdon tube type. The gage 116 includes a dial 117 having a scale 118, calibrated in the manner above stated, and a hand 119 movable with respect to the scale 118. The gage 116 is connected to the space 110ª through a conduit 116ª, and it will be understood that the extent of movement of the hand 119 relative to the scale 118, under the influence of the displacement of the fluid in the casing 110, visually indicates to the operator the amount of force or torque applied. It is to be further understood that the casing 110 is adapted to be secured to a handle, such as the handle 20 of Fig. 1, in any of the ways hereinbefore described, so long as the intended right-angular relationship between the unit 115 and handle is provided for.

My invention is further suited to a wrench employing electrical means for measuring the amount of force or torque applied to the work. Such an arrangement is shown in Figs. 16 and 17, in which I employ a unit 120 which includes a casing 121 adapted to be secured to a handle similar to the handle 20 in such a way as to bear the intended right-angular relationship already described. Any of the previously-described forms of connection will serve the purpose. The unit 120 includes a chamber 122 in which a storage battery 123 is mounted. The casing further includes a chamber 124 the outer end of which is closed by a screw plug 125 having an opening 126 through which a stem 127 of a handle, similar to the handle 26 (Fig. 1), passes. The inner end of the stem 127 is provided with a follower member 128 and a carbon pile or stack 129 constituting a carbon rheostat is confined between the screw plug 125 and such follower. The carbon pile 129 is provided with a central opening through which the stem 127 extends, and this stem is insulated from the several sections of the carbon pile by suitable insulation 130. Insulation 131 is also provided at the opposite ends of the carbon pile and around the sides thereof for an obvious purpose. It will be understood that the carbon pile is of such character that, as pressure thereon is increased, the resistance to flow of current therethrough is reduced; and, consequently, by passing the current from battery 123 through the carbon pile and measuring the flow of such current, I accurately determine the force or torque applied to the work through such carbon pile.

The current passing through the carbon pile 129, in the particular form illustrated, is measured by an ammeter 132, the dial 132ª of which is provided with a scale 133 calibrated to indicate the current condition in terms of, preferably, inch-pounds pressure applied to the work through the carbon pile. This ammeter is of ordinary, well-known form, including the rotatable indicator 134 which moves relative to the scale 133.

The parts just described may be connected in the electrical circuit in the manner illustrated in the diagram of Fig. 17. That is to say, the battery 123 is connected by suitable insulated wiring to the terminal 135 of the ammeter, and the carbon pile 129 is connected through suitable insulated wiring to the ammeter terminal 136. The carbon pile 129 is also connected through suitable insulated wiring and a switch 137 (not shown in Fig. 16) to the battery 123. The switch 137 may take any well-known form adapted to be manually operated; and, in use, when an operator applies the wrench to the work, the switch is closed so that the ammeter 131 will properly register the current condition. The switch 137 should be open when the wrench is not in use. If desired, a Wheatstone bridge type of circuit (not shown) may be employed instead of that illustrated in Fig. 17. Other than just described, the structure shown in Fig. 16 is similar to and operates in the same manner as the structures previously described.

In the forms previously described, the casing forming a part of the torque measuring unit has constituted a part separate from the wrench handle. In certain instances, it may be desirable to form the casing integrally with the handle; and such an arrangement is illustrated more or less diagrammatically in Fig. 18. Specifically, the handle 140 may be similar in all respects to the handle 20 of Fig. 1 except that the casing 141 of the torque measuring unit is formed integrally with the outer end of the handle, the same being so disposed relative to the handle that it has a fixed right-angular relationship similar to that described in connection with the previous forms. The casing 141 is preferably, but not necessarily, of cylindrical form, having its outer end closed by a detachable cap 142. The torque measuring function is carried out through a handle similar to the handle 26 of Fig. 1, having a stem 143 projecting into the casing to receive a follower 144 which acts upon a spring 145 similarly to the arrangement shown in Fig. 5.

It is believed that the operation and advantages of my invention will be understood from the foregoing description. My invention lends itself to a very simple form of torque measuring wrench which, however, is quite accurate in its recording function. The operation of the wrench is more or less of a foolproof nature so that it may be readily handled by unskilled labor. It serves the purpose equally well with small or large wrenches having either long or short handles.

I claim:

1. A torque measuring wrench comprising a shank or handle having means at one end for engagement with the work, a torque measuring unit at the other end of said handle, said unit including a handle device through which pressure is applied to the work and means for measuring the amount of force or torque so applied, and means for connecting said unit to said handle in such a way that it may be moved without affecting the position of said work engaging means from an operative position at substantially right angles to the axis of the work on one side of the handle to an operative position on the other and diametrically opposite side of the handle so that pressure may be applied to the work in opposed directions without detaching the wrench from the work, and means for latching said unit in said operative positions on said opposite sides of the handle.

2. A torque measuring wrench comprising a shank or handle having means at one end for engagement with the work, a torque measuring unit at the other end of said handle, said unit including a handle device through which pressure is applied to the work and means for measuring the amount of force or torque so applied, means for connecting said unit to said handle in such a way that it may be moved without affecting the position of said work engaging means from an operative position on one side of the handle to an operative position on the other side of the handle so that pressure may be applied to the work in opposed directions, and means between said handle and unit for rigidly and releasably holding said unit with its axis disposed at a predetermined angle with respect to the axes of said handle and the work in all operative positions of said handle.

3. A torque measuring wrench comprising a shank or handle having means at one end for engaging the same with the work and at substantially right angles to the axis thereof, torque measuring means at the other end of said handle including a member adapted to be grasped by the operator for applying pressure to the work, a connection between said member and handle permitting said member to be rotated to opposite sides of said handle without affecting the engagement of said work-engaging means with the work, and releasable latch means between said connection and handle for holding said member at substantially right angles to the axis of the work when said member is moved to opposite sides of said handle.

4. A torque measuring wrench comprising a shank or handle having means at one end for engaging the same with the work and at substantially right angles to the axis thereof, torque measuring means at the other end of said handle including a member adapted to be grasped by the operator for applying pressure to the work, a connection between said member and handle by which said member may be shifted rotatably upon said handle from one side thereof to the other and normally retained at right angles relative thereto, latch means between said handle and connection releasable for said rotatable shift movement of said member by shifting said member angularly relative to its rotary path, said latch means being so positioned that it holds said member at substantially right angles to the axis of the work when said member is moved to opposite sides of said handle.

5. A torque measuring wrench comprising a shank or handle having means at one end for engaging the same with the work and at substantially right angles to the axis thereof, torque measuring means at the other end of said handle including a member adapted to be grasped by the operator for applying pressure to the work, a connection between said member and handle by which said member may be shifted rotatably about said handle from one side thereof to the other and normally retained at right angles relative thereto, latch means between said handle and connection releasable for said rotatable shift movement of said member by shifting said member longitudinally of said handle, said latch means including a spring member adapted to self-return said member to latched position when said member is moved to predetermined positions on the opposite sides of said handle, and said latch means being so positioned that it holds said member at substantially right angles to the axis of the work in all latch-engaged positions thereof.

6. A torque measuring wrench comprising a shank or handle having means at one end for engaging the same with the work and at substantially right angles to the axis thereof, torque measuring means at the other end of said handle including a member adapted to be grasped by the operator for applying pressure to the work, a connection between said member and handle by which said member may be shifted rotatably about said handle from one side thereof to the other, latch means between said handle and connection releasable for said rotatable shift movement of said member by shifting said member outwardly away from and at substantially right angles to the axis of said handle, said latch means including a spring member adapted to self-return said member to latched position when said member is moved to predetermined positions on the opposite sides of said handle, and said latch means including a latch element so positioned on said handle and member that said member is held at substantially right angles to said handle and the axis of the work in all latch-engaged positions thereof.

7. A torque measuring wrench comprising a shank or handle having means at one end for engaging the same with the work and at substantially right angles to the axis thereof, torque measuring means at the other end of said handle including a member adapted to be grasped by the operator for applying pressure to the work, a connection between said member and handle by which said member may be rotated from one side of said handle to the other, and latch means between said member and handle for holding said member at substantially right angles to said handle and the axis of the work when said member is rotated to opposite sides of the handle, said latch means including an element carried by said handle and shiftable therealong into and out of engagement with said member and cooperating with said member to maintain said right angled relationship.

8. A torque measuring wrench comprising a handle member having means at one end for engaging the work, a torque measuring unit including a body adapted to be mounted at the other end of said handle member, an adjustable connection between said handle member and body by which the latter may be rotated from one side of the handle member to the other without affecting the engagement between said work-engaging means and the work and by which said body member is held on opposite sides of said handle member with its axis at substantially right angles to the axis of the work, another handle member supported by and movable relative to said body, and means between said body and other handle member displaceably opposing relative movement therebetween, and means for measuring the extent of relative movement between said body and other handle member in terms of pressure applied to the work through said other handle member.

9. A torque measuring wrench comprising an elongated shank, a work-engaging member on one end of said shank and having its axis extending at substantially right angles to the axis of said shank, and a torque measuring unit on the other end of said shank and through which force is applied to said shank and the work, said unit including means for measuring the force so applied, and means for attaching said unit to said shank in such a way that the force is applied through said unit in a line at substantially right angles to the axes of said shank and work-engaging member including a pair of releasable elements, one on said shank and the other on said unit, that are adapted to be engaged with each other to effect and maintain said right angular relationship.

HERMAN W. ZIMMERMAN.